Nov. 11, 1924.  
A. A. HENZI  
1,514,765  
STEREOTYPE PLATE MECHANISM  
Filed Feb. 17, 1921  4 Sheets-Sheet 1
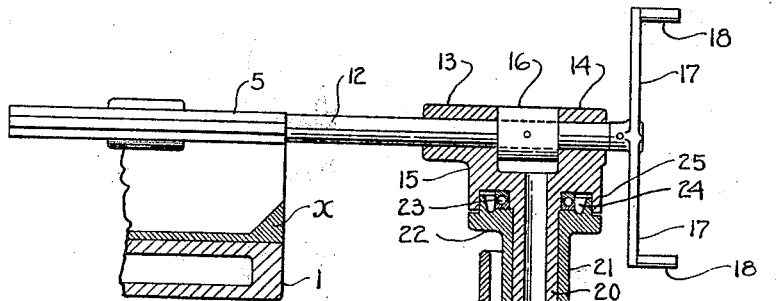
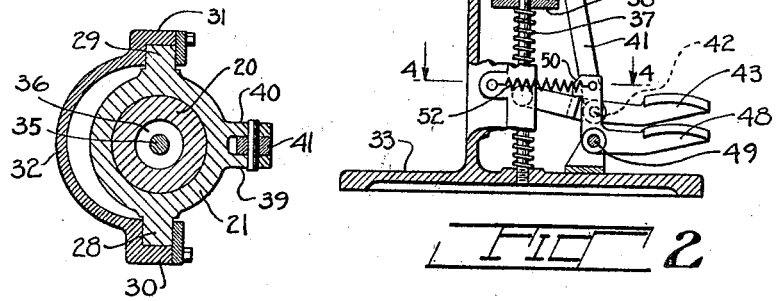
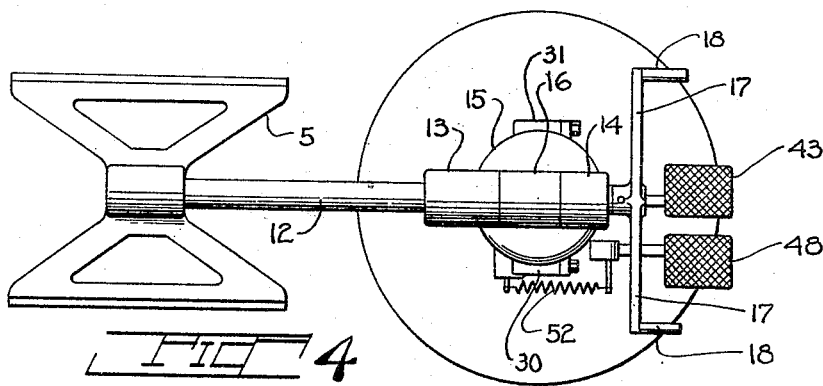
INVENTOR  
A. A. Henzi  
BY  
John D Morgan  
ATTORNEY Nov. 11, 1924.　　　　　　　　　　　　　　　　　　1,514,765
A. A. HENZI
STEREOTYPE PLATE MECHANISM
Filed Feb. 17, 1921　　　4 Sheets-Sheet 2
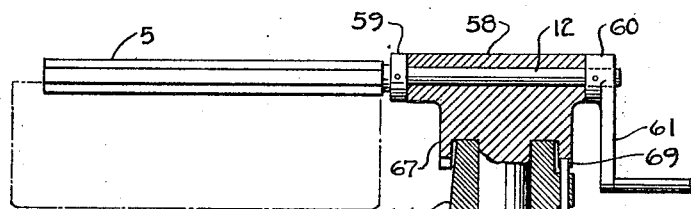
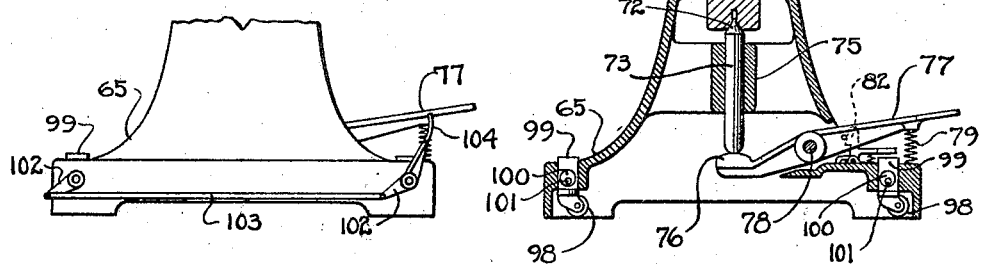
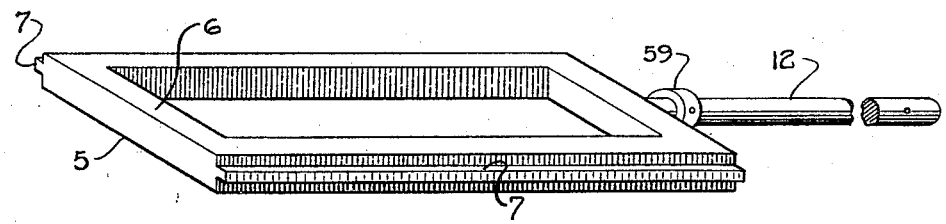
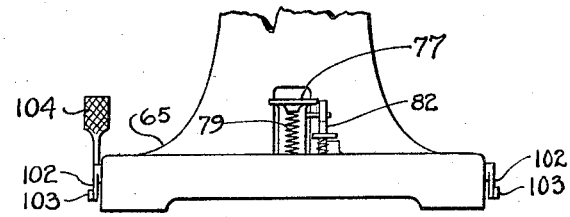
INVENTOR
A. A. Henzi
By John D Morgan
ATTORNEY Nov. 11, 1924. 1,514,765
A. A. HENZI
STEREOTYPE PLATE MECHANISM
Filed Feb. 17, 1921 4 Sheets-Sheet 3

INVENTOR
A. A. Henzi
BY John D. Morgan
ATTORNEY

Nov. 11, 1924.

A. A. HENZI 1,514,765

STEREOTYPE PLATE MECHANISM

Filed Feb. 17, 1921    4 Sheets-Sheet 4

INVENTOR
A. A. Henzi
BY
John D. Morgan
ATTORNEY

Patented Nov. 11, 1924.

1,514,765

UNITED STATES PATENT OFFICE.

ALBERT A. HENZI, OF CHICAGO, ILLINOIS, ASSIGNOR TO GOSS PRINTING PRESS COMPANY, A CORPORATION OF ILLINOIS.

STEREOTYPE-PLATE MECHANISM.

Application filed February 17, 1921. Serial No. 445,863.

*To all whom it may concern:*

Be it known that I, ALBERT A. HENZI, a citizen of the United States, residing at Chicago, in the county of Cook and State of Illinois, have made certain new and useful Improvements in Stereotype-Plate Mechanism, of which the following is a specification.

The invention relates to stereotype plate making mechanism and more especially to a plate delivering mechanism, or machine for mechanically removing a plate from the casting machine or mechanism and delivering it to a plate trimming mechanism or elsewhere as desired.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a central vertical, longitudinal section through a machine embodying the invention;

Fig. 2 is a full top plan of the machine shown in Fig. 1;

Fig. 3 is an enlarged horizontal section on the line 3—3 of Fig. 1;

Fig. 4 is a horizontal section on the line 4—4 of Fig. 1, on the same scale as that figure;

Fig. 5 is a central, vertical, longitudinal section through a modified form of the machine shown in Fig. 1;

Fig. 6 is a fragmentary elevation of the lower part of Fig. 5 looking thereat from the front;

Fig. 7 is a fragmentary elevation of the lower part of Fig. 5 looking thereat from the right;

Fig. 8 is a perspective view of a plate carrier of somewhat different form than the one shown in Figs. 1 and 2;

Referring now to the embodiment of the invention, illustrated by way of example in the accompanying drawings, the drag or concave member of a casting box is shown generally as 1, and preferably the drag is provided with a receding or recessible matrix-carrying part 2, which moves backwardly from casting position, thereby stripping the matrix from the plate through such movement. This recedent matrix-carrying back is shown clearly in Figs. 9, 10 and 11, and is described and shown in detail in application S. N. 408,203 of Albert A. Henzi, filed September 4, 1920.

The plate $x$ is supported in the body 1 of the drag at either end of the member 2, this support of the plate being shown in Fig. 1 of the drawings. The plate is preferably cast with a tail or extra portion at each end thereof for this purpose.

If desired, this delivery mechanism can also be employed with the saddles or elevating devices shown in application S. N. 454,001 of M. W. Brueshaber, filed March 2, 1921.

Figure 9:
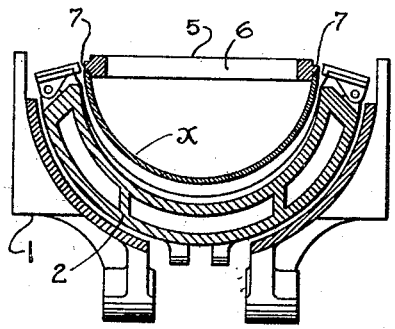
Fig. 9 is a transverse section through the drag of a casting box showing the plate carrier engaging the plate preparatory to removing it from the drag.

Referring now more particularly to the plate carrier 5 and its supporting and actuating mechanism, the carrier is shown with a central portion 6 of substantially the internal width or diameter of the stereotype plate $x$. At either side thereof the carrier has a horizontal longitudinally-disposed, outwardly projecting rib 7, the body portion 6 being adapted to fit within the concave side of the plate, the straight edges of the plate resting against or upon and along the tongues or members 7 and the sides of the plate immediately adjacent the straight edges resting against the external sides of the body 6. The plate carrier 5 is reversible, that is, it will carry a plate x upon either side thereof, thereby avoiding idle rotation of the carrier to bring it to plate-receiving position. The plate carrier is designed to have vertical motion toward and away from the plate x to bring it into the above described engagement with the straight edges of the plate while the plate is resting in the drag with its concave side upwardly, as shown in Fig. 9.

Figure 10:
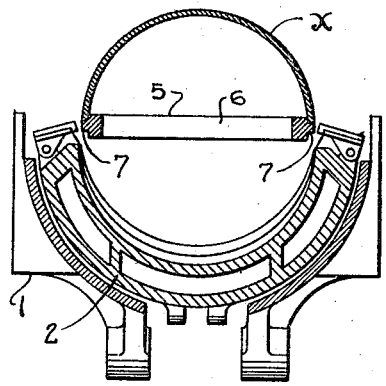
Fig. 10 shows the plate carrier after having rotated the plate into position above and supported upon the carrier.
Figure 11:
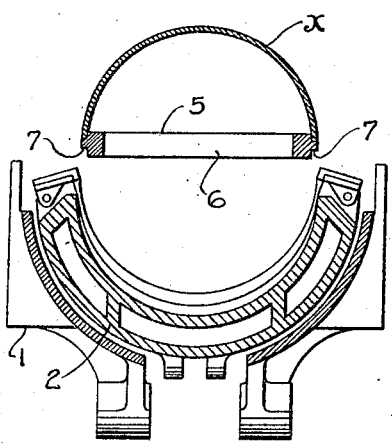
Fig. 11 shows the plate carrier in raised position ready to be swung or rotated outwardly away from the casting box.

The plate carrier has also rotary movement while so in engagement with the plate x to bring the plate above the plate carrier 5, with the straight edges of the plate resting upon the tongues or projections 7, as shown in Fig. 10. In addition to said vertical movement to lift the plate and carrier free from the drag, as shown in Fig. 11, the plate carrier 5 has angular or rotational movement in a substantially horizontal plane to move the plate away from the drag and into operative relation with a plate-trimming machine, or to deposit it upon a delivery table, or other suitable receptacle.

Referring now in detail to the supporting and moving mechanism for the plate carrier, as embodied, it has fixed thereto a horizontally extending shaft 12, which shaft is journaled in bearings 13 and 14 in a support 15, which support is movably mounted on the machine frame. A collar 16 is fixed on shaft 12, between the two bearings 13 and 14, to prevent longitudinal displacement of the shaft. Shaft 12 is provided with one or more crank arms 17, provided with handles 18, whereby the shaft is rotated in its bearing, to impart the rotary movement to the plate carrier, which removes the plate from the drag, and also to impart the horizontal swinging or rotating movement to the carrier and its supporting plate, to effect the delivery of the plate, as already briefly described.

The support 15 has fixed to or integral therewith a downwardly projecting cylindrical sleeve 20, which fits closely within a sleeve 21 which is part of a vertically movable or reciprocable carrier 22 for the support 15. The carrier 22 is directly beneath and is provided with supporting means for the support 15, whereby the carrier and support have upward and downward movement together, but the support 15 has horizontal rotary or angular movement upon, and relatively to, its carrier 22. As embodied, an annular ball or roller bearing 23 is provided on top the carrier 22 for the support 15, and it is preferably arranged closely about the sleeve 20. Projecting upwardly from the carrier 22 is an annular flange 24, which fits within a downwardly depending flange 25, fixed to or integral with the support 15.

Means are provided for supporting and guiding the entire mechanism already described for vertical reciprocatory relative movement between the plate carrier 5 both for the purpose of removing the plate from the drag on to the carrier and for later lifting the carrier with the plate thereon, as already described. As embodied, there are provided upon the exterior of the sleeve 21 of the support 22 two diametrically-spaced, vertically-disposed, outwardly-projecting guiding lugs 28 and 29, which work in corresponding guideways 30 and 31, these guideways being formed upon a column 32 arising out of, and preferably integral with the base 33 of the machine.

As embodied, the raising and lowering of the plate carrier and its support is effected by foot power applied by the workman, and a cooperating automatic spring mechanism, thereby leaving both hands of the workman free during the delivery of the plate. As embodied, the mechanism is depressed by foot-power, and is automatically raised preferably by the spring action, when the foot pressure is released. A vertically disposed rod 35 is fixed to and extends upwardly from the base 33 of the machine, the rod projecting within the hollow 36, which is formed centrally in the sleeve 20 of the plate support 15. A powerful spring 37 is coiled about the rod 35 in compression between the base plate 33 and the bottom 38 of the carrier 22.

Formed on the carrier 22 are lugs 39 and 40, which constitute a pivotal connection for a link 41. The link 41, at its opposite end 42 is pivotally connected to a foot lever 43, which lever is forked or yoked, and has pivotal bearings at 44 and 45 upon the column 32 of the machine frame.

Means are provided for holding the mechanism in depressed position against the action of the spring 37, and as embodied a lever 48 is pivotally supported at 49 upon the machine base 33, lever 48 having its tail bent upwardly and provided with a hook 50, which engages over one of the forks of lever 43. Lever 48 is yieldingly held in position to engage the lever 43 by a spring 52, and snaps back and then over lever 43 when it is depressed.

The manner of the operation of the mechanism so far described may be briefly restated as follows:—

The carrier 5 is swung over the plate x lying with its concave side upward in the drag. The operator then steps upon lever 43, moving the plate carrier and its supporting mechanism downwardly until the carrier is in the position of Fig. 9. The hook 50 holds the carrier in this position. By means of the handle 18, the plate carrier 5 is rotated until the plate x is brought to the position of Fig. 10. The workman then steps upon lever 48, and lever 43 is thereby released from hook 50, and spring 37 raises the plate carrier to the position of Fig. 11. Thereupon, by means of the handles 18, the plate may be swung angularly horizontally away from the drag, the support 15 rotating upon its carrier 22, as shown in Figs. 12 and 13.

Figure 12:
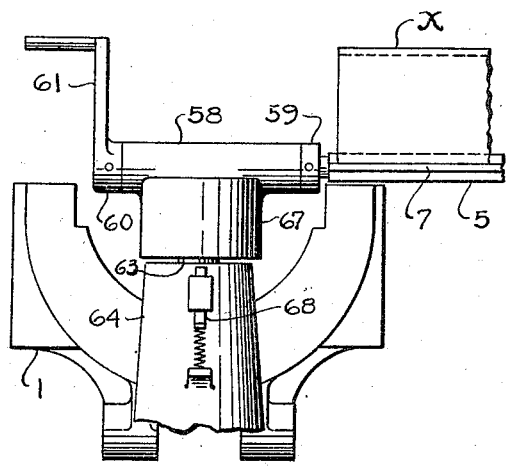
Fig. 12 shows the casting box in elevation, and the plate delivering mechanism swung or rotated around to or toward delivery position.
Figure 13:
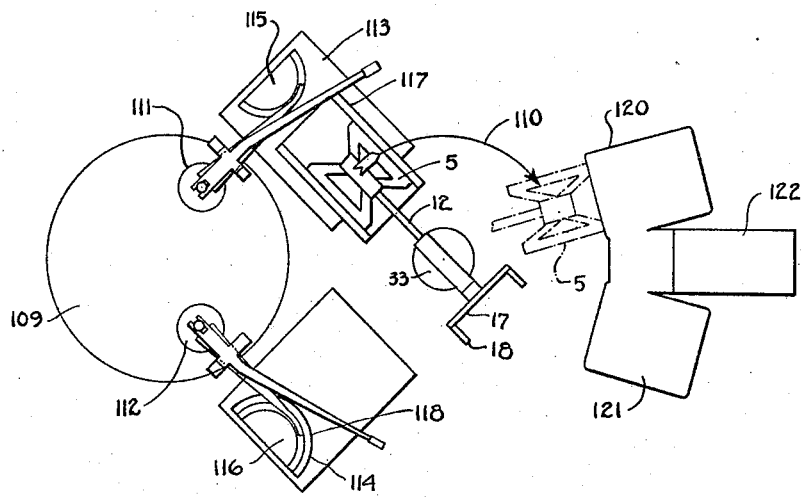
Fig. 13 is a diagrammatic view of two casting mechanisms served by a single plate delivery mechanism and by a single plate trimming mechanism.

Referring now to the somewhat different form of mechanism shown in Figs. 5 and 12, a plate carrier 5 has its horizontally-disposed shaft 12 journaled in a support 58, with a spacing collar 59 at one end thereof. Fixed to shaft 12 is a crank 61, the hub 60 thereof serving as a spacing collar against the support 58. Projecting downwardly from the support 58, fixed to and preferably integral therewith, is a cylindrical member or column 63, fitting within a cylindrical opening in a pillar 64, which pillar projects upwardly from the base 65 of the machine. The support 58 is provided with a downwardly-projecting, annular flange 67, which encircles the cylindrical upper portion of the column 64. A spring latch 68 may be employed, engaging with teeth 69 formed on the bottom edge or crown of the flange 67 to angularly or rotatively position the carrier just above the drag to take the plate, and to position it at the place of delivery.

The cylindrical column 63 is supported upon the conical top 72 of a rod 73, the lower end of the column 63 having therein a recess shaped to fit upon the conical head of the rod. The rod 73 is mounted in a support 75 on the machine frame, is longitudinally slidable in its mounting, and its lower end rests upon the end 76 of a foot lever 77. Foot lever 77 is pivoted at 78 upon the machine frame, and may be provided with a restoring spring 79, which spring, however, will not usually be found necessary.

With this form of the mechanism, the plate carrier is normally in its lower or depressed condition. When the carrier is to be swung over the drag to remove the plate therefrom, the workman steps upon the foot lever 77, thereby raising the plate carrier, and after it is in position above the drag, the pedal lever 77 is released, and the plate carrier comes to the position of Fig. 9, ready to rotate the plate. The crank, or double crank, arms 61 are then rotated to the position of Fig. 10, and thereupon the workman again steps upon foot lever 77, and the plate x supported upon the carrier 5 is brought to the position of Fig. 11. The plate carrier and its support is then rotated upon the pin 73 to swing the plate horizontally angularly away from the drag, as shown in Figs. 12 and 13.

A holding lever 82 may be provided for the foot lever 77, as shown in Fig. 5, and may be generally similar in its operation to the holding lever 48 already described in connection with the form of mechanism shown in Figs. 1 and 2. When this holding lever is employed, it is not necessary for the workman to keep his foot upon the lever 77.

Means are provided for rolling the machine from place to place, while leaving it upon a firm and stable base when in operating position. Such means are shown in Figs. 5, 6 and 7. Rollers or casters 98 are mounted in supports 99, which supports are vertically slidable in the machine frame. The supports 99 are mounted on eccentrics 100, which are fixed on shaft 101, which is mounted in the machine frame. The shaft 101 has fixed thereto arms 102, which are pivotally connected together by a link or links 103. One of the shafts 101 has a foot pedal 104 connected thereto, whereby the casters 98 may be retracted above the level of the base, or projected therebelow, dependent on whether the machine is to rest firmly upon the floor or it is desired to move it from place to place.

In Fig. 13 the arrangement is shown of a furnace and melting pot 109 for the stereotype metal, provided with pumps 111 and 112, serving, respectively, casting machines 113 and 114. These machines have, respectively, cores 115 and 116, and drags 117 and 118. The plate carrier 5 is shown removing a plate from the drag 117, while drag 118 is in casting position. The manner of removing the plate from the drag has already been described. The horizontal angular or rotatory delivering movement of the plate is indicated by the arrow 110, and a trimming machine is indicated conventionally by the reference numerals 120, 121 and 122.

The trimming machine may be of any convenient or adequate construction and manner of operation, and the plates may be delivered thereto directly by the carrier 5 or may be delivered to a receiving table for the trimming or finishing machine.

Figure 14:
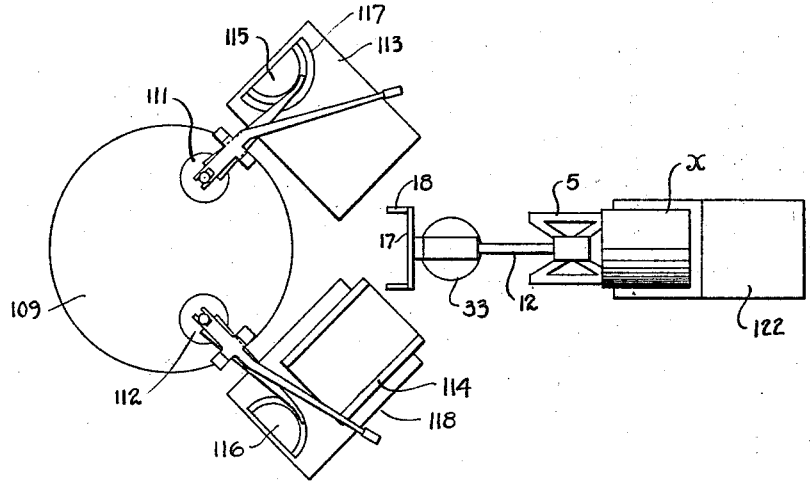
Fig. 14 is a similar view showing the plate delivering mechanism delivering directly to the plate trimming mechanism.

In Fig. 14 the plate carrier is shown delivering the plate directly to the finishing machine. Usually, however, the use of the storage or receiving tables is preferable as it gives more flexibility between the casting machines and the finishing machine as to speed and time of operation. The mechanism in either arrangement, or where used merely as a delivery from the casting machine, obviates the manual handling of the heavy and hot plates, and avoids also the necessity of waiting for the plates to cool in the casting machine before they can be handled, and also speeds up the operation of the casting machines, and thereby of the entire system.

The invention in its broader aspects is not limited to the specific mechanisms shown and described but departures may be made therefrom within the scope of the accompanying claims without departing from the principles of the invention and without sacrificing its chief advantages.

What I claim is:—

1. A machine for delivering stereotype plates from a casting machine, including in combination, means for removing a plate from the casting machine and means for moving the plate in an angular path to a delivery position.

2. A machine for delivering stereotype plates from a casting machine, including in combination, means for removing a plate from the casting machine and means for rotating the removing means with the plate thereon to a place of delivery.

3. A machine for delivering stereotype plates from a casting machine, including in combination, means for removing a plate from the casting machine and means for moving the plate along a horizontal path about a center to a place of delivery.

4. A machine for delivering stereotype plates from a casting machine, including in combination, means for removing a plate from the casting machine and means for moving the plate along a circular path to a place of delivery.

5. A machine for delivering stereotype plates from a casting machine, including in combination, means for removing a plate from the casting machine and means for raising the plate and for moving it along a curved path to a place of delivery.

6. A machine for delivering stereotype plates from a casting machine, including in combination, means for removing a plate from the casting machine and means for raising the plate and for moving it along a curved horizontal path to a place of delivery.

7. A machine for delivering stereotype plates from a casting machine, including in combination, means for removing a plate from the casting machine by rotational movement and means for moving the plate in an angular path to a delivery position.

8. A machine for delivering stereotype plates from a casting machine, including in combination, means for removing a plate from the casting machine by rotational movement and means for rotating the removing means with the plate thereon to a place of delivery.

9. A machine for delivering stereotype plates from a casting machine, including in combination, means for removing a plate from the casting machine by rotational movement and means for moving the plate along a horizontal path about a center to a place of delivery.

10. A machine for delivering stereotype plates from a casting machine, including in combination, means for removing a plate from the casting machine by rotational movement and means for subsequently raising the plate and for moving it along a curved path to a place of delivery.

11. A machine for delivering stereotype plates from a casting machine, including in combination, means for removing a plate from the drag of a casting machine and means for moving the plate in an angular path to a delivery position.

12. A machine for delivering stereotype plates from a casting machine, including in combination, means engageable with the straight longitudinal edges of the plate for removing a plate from the drag of a casting machine and means for rotating the removing means with the plate thereon to a place of delivery.

13. A machine for delivering stereotype plates from a casting machine, including in combination, a frame engageable with the straight longitudinal edges of the plate for removing a plate from the drag of a casting machine and means for moving the plate and frame along a horizontal path about a center to a place of delivery.

14. A machine for delivering stereotype plates from a casting machine, including in combination, means rotatable about a horizontal axis for removing a plate from the drag of a casting machine and means for raising the plate and for moving it along a curved path to a place of delivery.

15. A machine for delivering stereotype plates from a casting machine, including in combination, a frame engageable with the straight longitudinal edges of the plate for removing a plate and frame from the drag of a casting machine by rotational movement and means for moving the plate in an angular path to a delivery position.

16. A machine for delivering stereotype plates from a casting machine, including in combination, means engageable with the straight longitudinal edges of the plate for removing a plate from the drag of a casting machine by rotational movement about a horizontal axis and means for rotating the removing means with the plate thereon to a place of delivery.

17. A machine for delivering stereotype plates from a casting machine, including in combination, means engageable with the straight longitudinal edges of the plate for removing a plate from the drag of a casting machine by rotational movement and means for subsequently raising the plate and for moving it along a curved path to a place of delivery.

18. A machine for delivering sterotype plates from a casting machine, including in combination, a plate carrier, a support therefor, and means for rotating the plate carrier in a substantially horizontal plane to carry the plate from a casting machine to a place of delivery.

19. A machine for delivering stereotype plates from a casting machine, including in combination a plate carrier, a support therefor, means for raising and lowering the carrier and its support in delivering the plate, and means for rotating the plate carrier in a substantially horizontal plane to carry the plate from a casting machine to a place of delivery.

20. A machine for delivering stereotype plates from a casting machine, including in combination a plate carrier, a support therefor, means for raising and lowering the carrier and its support in delivering the plate, and means for rotating the plate carrier relatively to its support in a substantially horizontal plane to carry the plate from a casting machine to a place of delivery.

21. A machine for delivering stereotype plates from a casting machine, including in combination a plate carrier, a support therefor, means movable relatively to the support for raising and lowering the carrier and its support in delivering the plate, and means for rotating the plate carrier in a substantially horizontal plane to carry the plate from a casting machine to a place of delivery.

22. A machine for delivering stereotype plates from a casting machine, including in combination a plate carrier, a support therefor, means for rotating the carrier about a horizontal axis to take the plate from the casting machine, and means for rotating the plate carrier in a substantially horizontal plane to carry the plate from a casting machine to a place of delivery.

23. A machine for delivering stereotype plates from a casting machine, including in combination a plate carrier, a support therefor, and manually operated means for rotating the plate carrier to carry the plate from the casting machine to the place of delivery.

24. A machine for delivering stereotype plates from a casting machine, including in combination a plate carrier, a support therefor, manually operated means for rotating the plate carrier to carry the plate from the casting machine to the place of delivery, and means for raising and lowering the carrier and its support in delivering the plate.

25. A machine for delivering stereotype plates from a casting machine, including in combination a plate carrier, a support therefor, manually operated means for rotating the plate carrier to carry the plate from the casting machine to the place of delivery, means for raising and lowering the carrier and its support, and means for rotating the carrier on its support in delivering the plate.

26. A machine for delivering stereotype plates from a casting machine, including in combination a machine frame, a support movable up and down thereon, and a plate carrier carried on the support and vertically movable therewith and rotatable upon the support.

27. A machine for delivering stereotype plates from a casting machine, including in combination a machine frame, a support movable up and down thereon, and a plate carrier carried on the support and vertically movable therewith and rotatable in a horizontal plane upon the support.

28. A machine for delivering stereotype plates from a casting machine, including in combination a machine frame, a support movable up and down thereon, and a plate carrier carried on the support and vertically movable therewith and rotatable in a vertical direction upon the support.

29. A machine for delivering stereotype plates from a casting machine, including in combination a machine frame, a support movable up and down thereon, and a plate carrier carried on the support and vertically movable therewith and rotatable in both the horizontal and vertical directions upon the support.

30. A machine for delivering stereotype plates from a casting machine, including in combination a plate carrier engaging with the straight edges of the plate, a shaft carrying the plate carrier, a journal bearing for the shaft, a support for the bearing shaft and carrier, and manually operated means for rotating the shaft in its bearing.

31. A machine for delivering stereotype plates from a casting machine, including in combination a plate carrier engaging with the straight edges of the plate, a shaft carrying the plate carrier, a journal bearing for the shaft, a support for the bearing shaft and carrier, manually operated means for rotating the shaft in its bearing and means for rotating the shaft and its bearing upon the support.

32. A machine for delivering stereotype plates from a casting machine including in combination a plate carrier engaging with the straight edges of the plate, a shaft carrying the plate carrier, a journal bearing for the shaft, a support for the bearing shaft and carrier, manually operated means for rotating the shaft in its bearing, and means for moving the support up and down to raise and lower the plate carrier.

33. A machine for delivering stereotype plates from a casting machine, including in combination a plate carrier engaging with the straight edges of the plate, a shaft carrying the plate carrier, a journal bearing for the shaft, a support for the bearing shaft and carrier, manually operated means for rotating the shaft in its bearing, means for rotating the shaft and its bearing upon the support, and means for moving the support up and down to raise and lower the plate carrier.

34. In combination, a stereotype plate casting mechanism and means engageable with the straight longitudinal edges of the plate for removing the plate from the casting mechanism.

35. In combination, a stereotype plate casting mechanism and means engageable with the straight longitudinal edges of the plate and independent of the casting mechanism and taking no part in the casting operation, for removing the plate from the casting mechanism.

36. In combination, a stereotype plate casting mechanism and means engageable with the straight longitudinal edges of the plate for removing the plate from the casting mechanism by rotary motion about the longitudinal axis of the plate.

37. In combination, casting mechanism comprising a core and drag, and means engageable with the straight longitudinal edges of the plate as it lies in horizontal position in the drag, for removing the plate therefrom.

38. In combination, casting mechanism comprising a core and drag, and means engageable with the straight longitudinal edges of the plate as it lies in horizontal position in the drag, for turning the plate over and removing it from the drag.

In testimony whereof, I have signed my name to this specification.

ALBERT A. HENZI.